March 3, 1931.  C. W. GREEN  1,795,116
CASH REGISTER
Filed Oct. 24, 1925   6 Sheets-Sheet 6

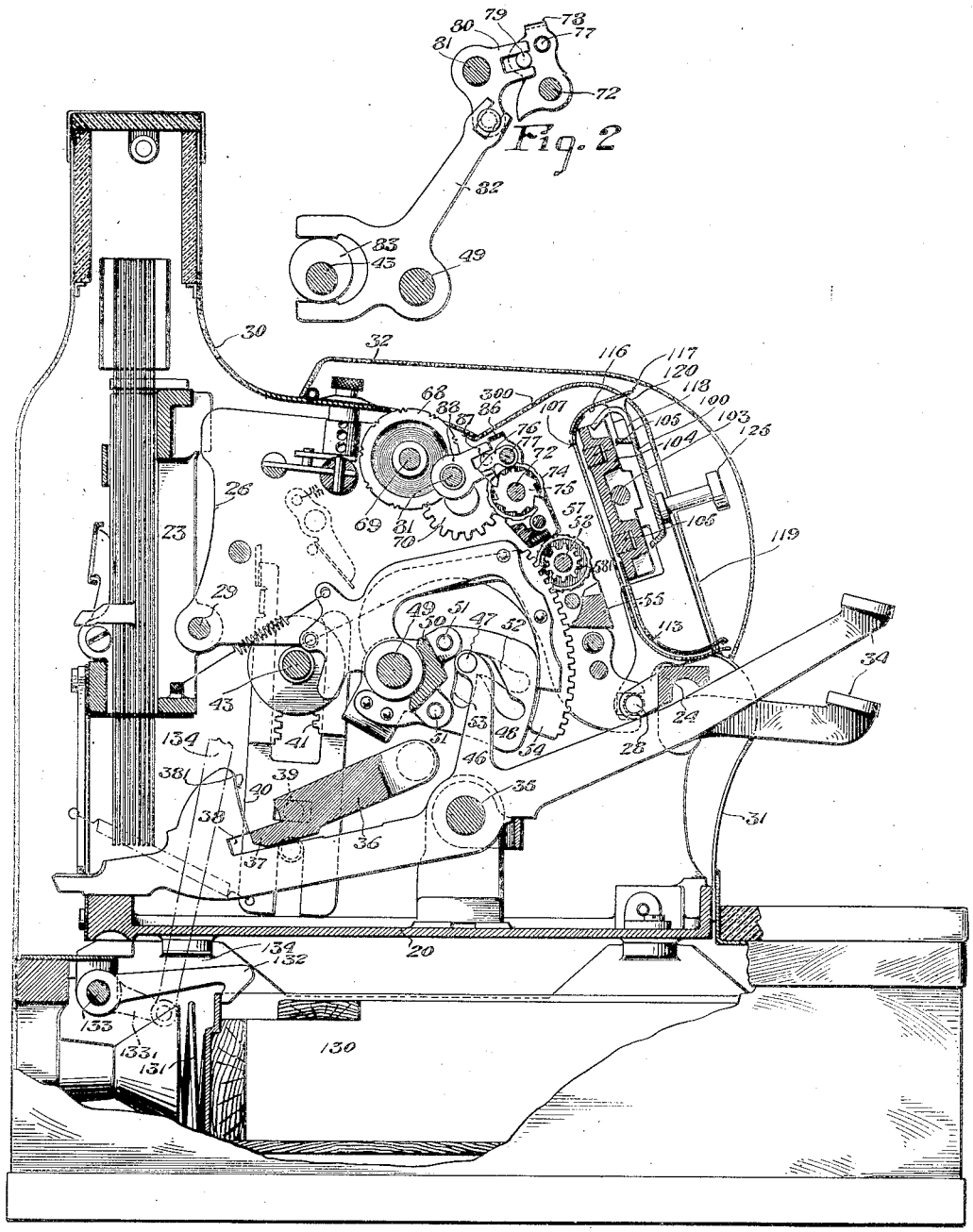

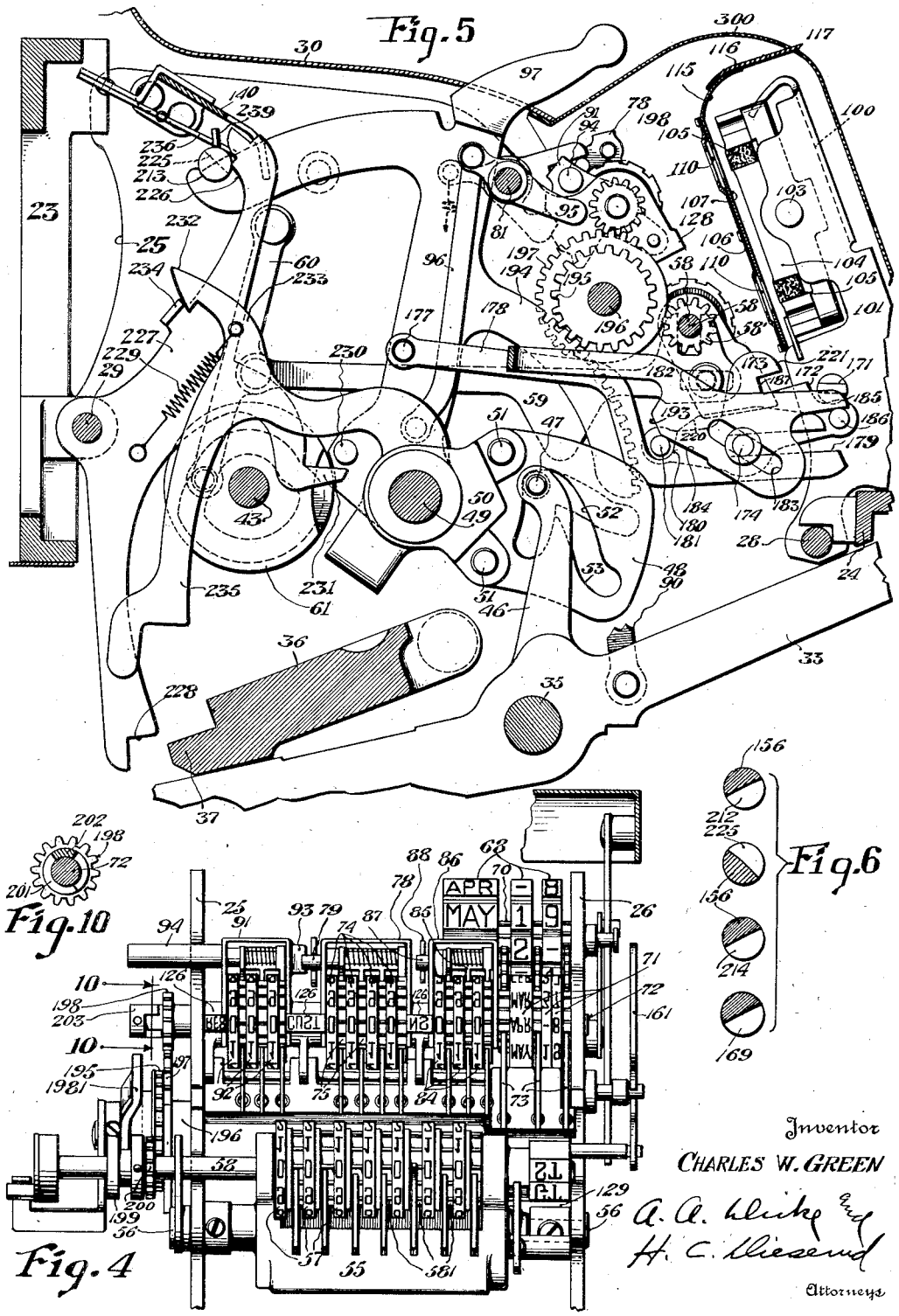

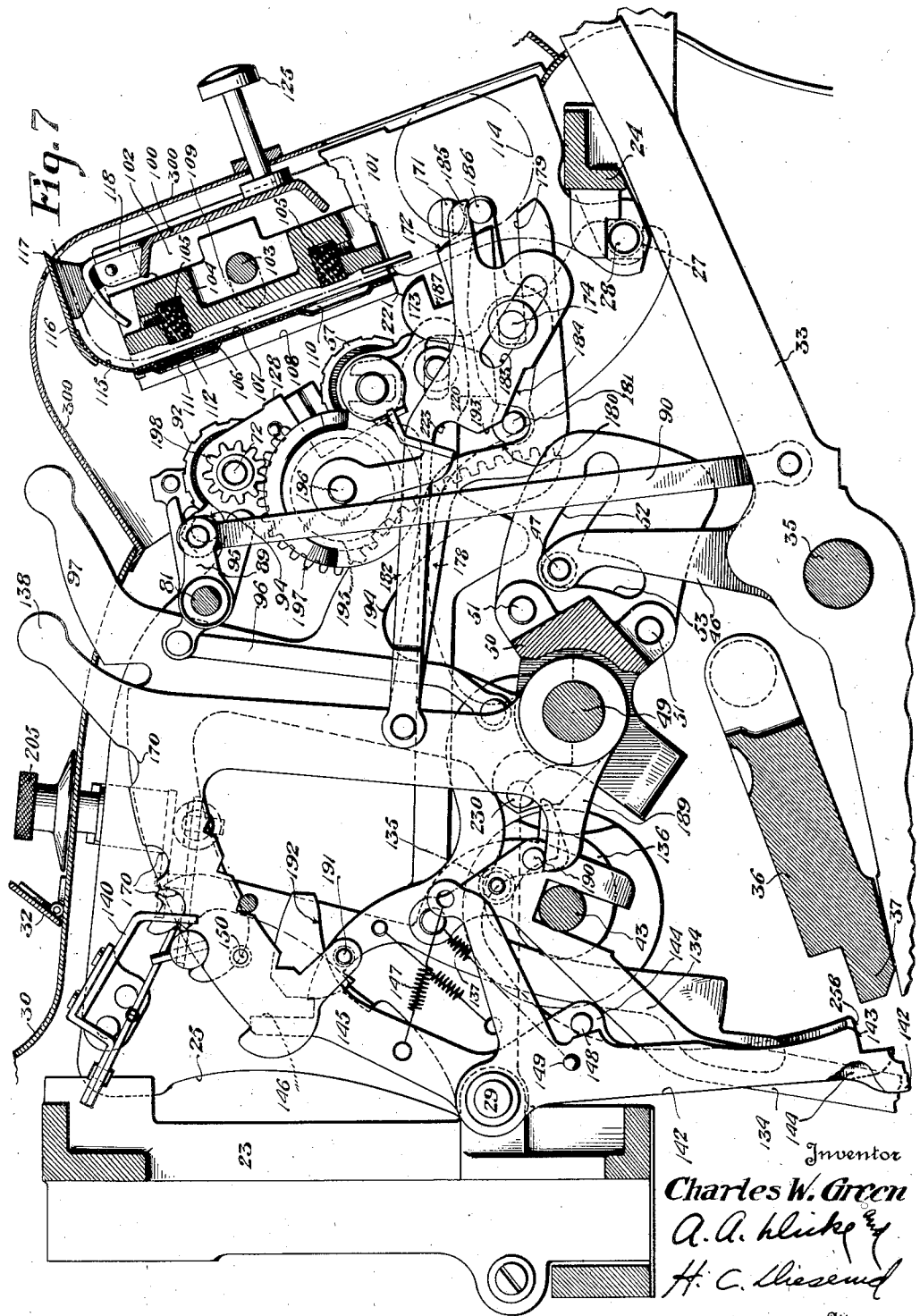

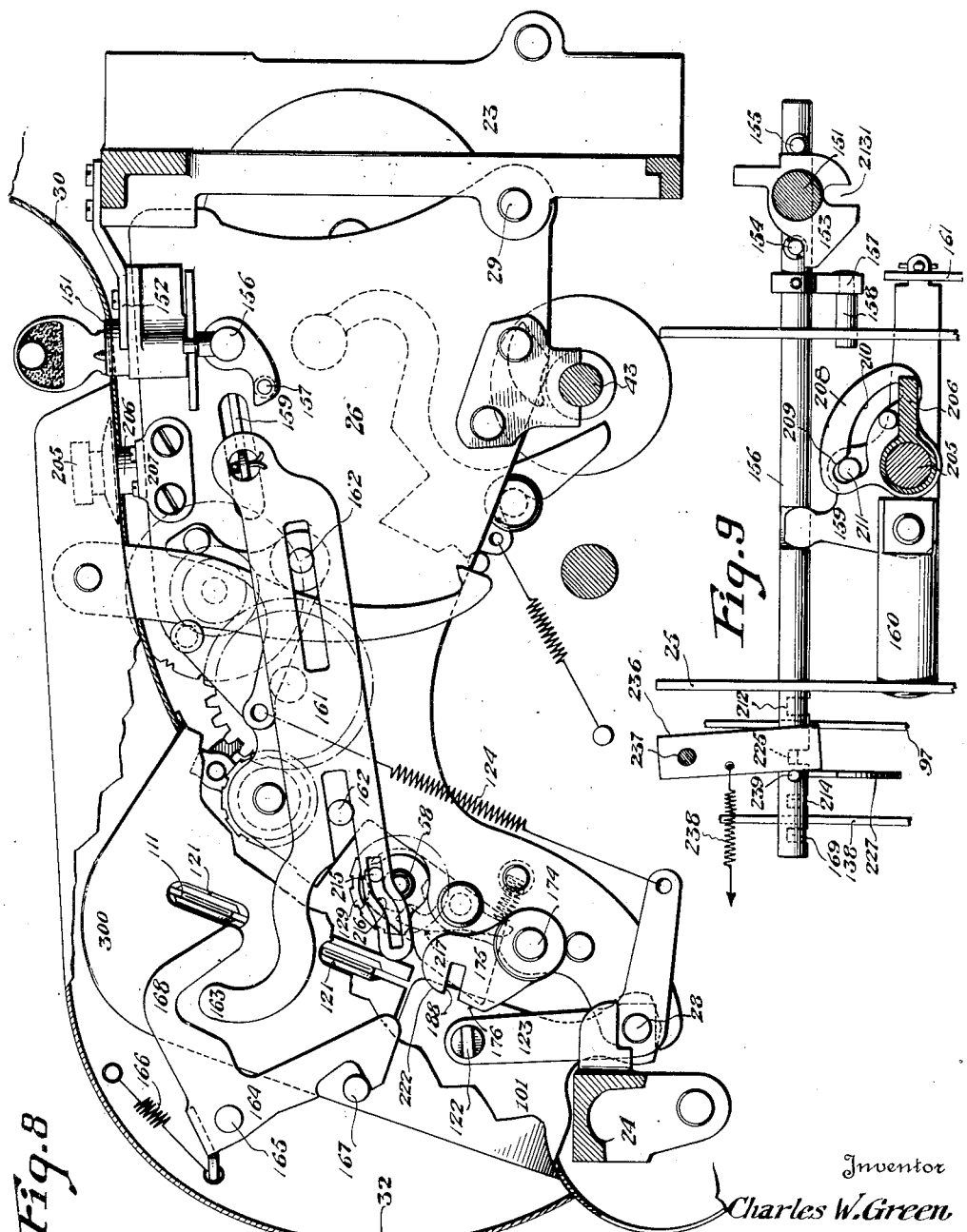

Inventor
Charles W. Green
By A. A. Whitney
H. C. Liesegang
Attorneys

Patented Mar. 3, 1931

1,795,116

UNITED STATES PATENT OFFICE

CHARLES W. GREEN, OF ILION, NEW YORK, ASSIGNOR TO REMINGTON ARMS COMPANY, INC., A CORPORATION OF DELAWARE

CASH REGISTER

Application filed October 24, 1925. Serial No. 64,627.

This invention relates generally to cash registers of the key operated type and particularly to that class adapted to totalize a series of items and employing printing devices for obtaining the printed totals and other related information.

In cash registers of the type particularly suited for obtaining printed totals it is desirable that some of the totals which are obtained be followed by a clearing operation while other totals obtained should be independent of a clearing operation. In those operations where no clearing is performed after the printing of totals the printed record material will show "running" or intermediate totals and it will indicate the amount of business transacted subsequent to the last clearing operation and up to the time that the total is printed. At the termination of some arbitrary period a total which, in the art, is designated as a "grand" or final total is obtained and it is followed by a clearing or resetting operation so that the totalizer elements may be ready for the accumulation of items pertaining to a subsequent period of business.

In order that the machine should be capable of properly designating the character of the total which has been printed it is broadly an object of the present invention to include means whereby each printed total will be accompanied by a special printed character or distinguishing mark. For the purpose of providing a suitable check upon the resetting operations to which the totalizer may be subjected the present invention further contemplates the inclusion of means for indicating upon the record material the number of times that the totalizer and certain special counters have been restored to zero. By properly preserving the printed records which contain the special designation indicating the taking of a grand total and by insuring that these records contain consecutively the numbers indicating the number of resetting operations performed a complete check is provided over the totals of amounts entered into the machine.

Registers of the type herein disclosed which are adapted to print totals are especially suited to a system of chain stores in which the manager of each individual store daily submits to the head office a printed record from which the day's business may be ascertained by a comparison of the running total for a particular day with the running total of the preceding day. Periodically an auditor may visit each store and obtain a total of the business accumulated during the arbitrary period and subsequently he may restore the totalizer elements to their zero positions so that they may separately accumulate the items comprising a subsequent period. Without the employment of suitable distinguishable characters for identifying the printed totals and other safeguards which will be mentioned it will be obvious that a dishonest auditor might fraudulently obtain a printed record exhibiting a total of the business transacted merely up to some time prior to the actual termination of the regular period while the resetting could then be performed at the end of such regular period. Since he ordinarily collects the cash receipts he would then be responsible to the head office for only the amount represented by the last printed total, which would permit him to retain personally the amount of cash received between the time the total was printed and the time the accumulators were restored to zero.

Such fraudulent operation would, of course, be quite difficult if the managers of the various stores were careful to observe and report the improper operations of the auditor, but as is all too frequently the case the managers and the auditor may be in collusion. The ability to defraud the company would moreover be greater where one person alone is made responsible for all the totals submitted to the head office since, in such case in the absence of careful checking and inspection, he could submit such printed records as he desired, and the attempt to defraud could only be discovered by an inventory of the stock the taking of which itself is a laborious task.

In order that such opportunity for fraud may be reduced to a minimum the present invention contemplates the use of suitable means whereby a resetting operation may not be performed without first manipulating a controlling element to predetermine the printing of a special character upon the next total printing operation and to prevent the entry of further items in the machine until the resetting operation has been carried out.

In the illustrative embodiment of the present invention, the printing mechanism which is adapted to print the various totals and other information upon a record strip is normally safe-guarded against improper and fraudulent operations by unauthorized persons by a hinged cover which is releasable by the operation of a lock. The total printing button which, when operated, serves to print the desired data upon the record material is normally locked under this cover but when the cover is raised and a manipulative device which is unlocked simultaneously with the cover, is brought to a certain position, the button may be operated freely. In order that the totals which are not followed by a subsequent clearing operation may be suitably identified a special character printing element is provided which in its normal position will indicate this fact upon the record material, while if the printing of a total is to be followed by a clearing operation the same printing element will be shifted to cause the printing of a different special character.

In order to properly identify such a total which is to be followed by the clearing operation, it is necessary to adjust a special knob before the printing operation is performed. Adjustment of this knob serves to set the special type printing element so that when the printing button is subsequently operated the proper identifying character will be printed upon the record strip. Adjustment of the knob serves in addition to unlock the resetting lever which is normally locked, but the operator will, of course, obtain the printed total before this lever is manipulated to zeroize the totalizer elements. Besides the shifting of the special type element and the unlocking of the resetting lever by the adjustment of the special knob certain other mechanism comes into play whereby the keys are locked against a subsequent operation until the resetting lever has been manipulated. After the final total has been printed the manipulation of the resetting lever not only zeroizes the totalizer elements but in addition, unlocks the operating keys.

The resetting lever also has suitable connections to an item counter whereby the latter will count only effective resetting operations, and for this purpose it is so arranged that an operation of the lever will merely condition the counter for operation and the unit will only be added to the counter upon a subsequent operation of the machine by the operating keys.

The present invention embraces a number of interlocking devices between the different manipulative members so that mis-operations either intentional or accidental may be minimized or entirely eliminated. The interlocks which are provided are very simple but effective in operation, thus precluding any possibility of them becoming out of order.

Additional mechanism is also provided whereby, if desired, after the resetting lever is operated it is possible to enter a series of items in the zeroized totalizer and print this total with the character identifying final totals, this operation being permitted without alternate operation of the operating keys and the resetting lever.

Many other objects and advantages of the invention will appear from the detailed description of a preferred embodiment which will hereinafter be given and it will be noted that by the employment of devices for printing special characters the opportunity for fraud will be greatly minimized thereby enhancing the value of the registers to which the present invention is applied.

With these and incidental objects in view the invention consists of certain novel features of construction and combination of parts, the essential elements of which are set forth in the appended claims and a preferred form of embodiment of which will now be described with reference to the drawings which accompany and form part of the specification.

Of said drawings:

Fig. 1 is a sectional view of the machine taken substantially through its mid-portion. This view shows particularly the differential and totalizing devices and their relation to each other as well as a section through the printing mechanism provided for effecting total printing from the totalizer and other type wheels.

Fig. 2 is a detail of the operating devices for the "Customer" counter.

Figure 3:
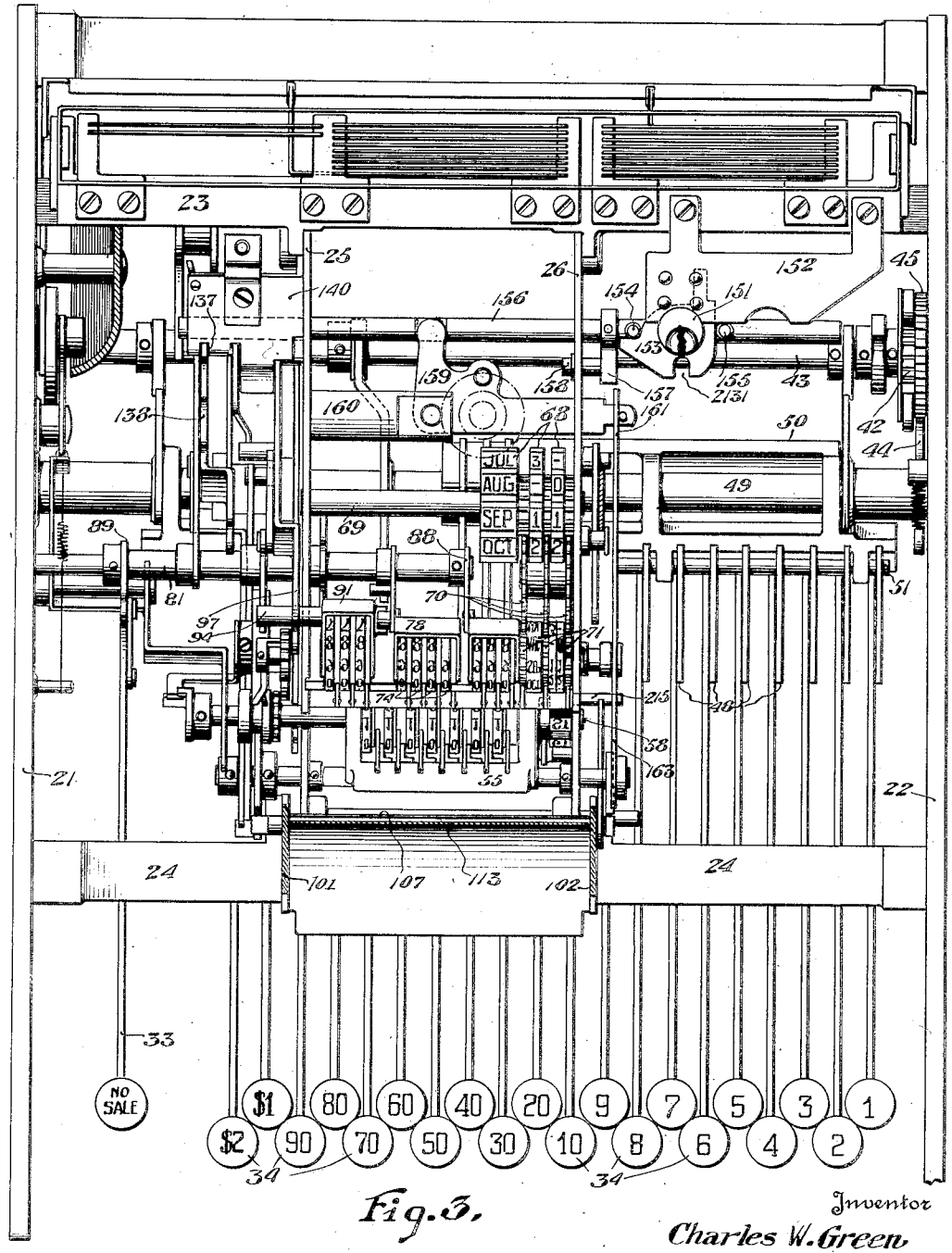

Fig. 3 is a top plan view of the machine, the cabinet having been removed. This view shows the arrangement of the operating keys, the totalizer, the special counters and date setting and printing wheels. This view also shows the lock which is provided to unlock the hinged cover to obtain access to the different manipulative devices.

Fig. 4 is a view taken in a plane which is substantially parallel to a plane passing through the shafts which support the printing type wheels and shows the totalizer, the date setting wheels, and special counters. This figure also illustrates the resetting means common to the totalizer and special counters.

Fig. 5 is a sectional view of the machine showing a portion of the printing mechanism, the totalizer engaging devices and the lever for resetting the various registering elements to their zero positions. This view shows also the means for normally locking the resetting lever against operation, as well as the devices controlled by the special knob for unlocking it and locking the operating keys.

Fig. 6 is a collective view showing the various slots formed in the lock controlled shaft.

Fig. 7 is a view similar to Fig. 5 and in addition shows the control lever together with the associated locking devices whereby the machine may be operated in different ways.

Fig. 8 is a view toward the left, taken on a section just to the right of one of a pair of the intermediate supporting frames, showing the lid releasing devices and the devices for adjusting the special character printing element.

Fig. 9 is a detail of the locking devices whereby the lock controlled shaft may be shifted to different positions to give control over the various manipulative devices.

Fig. 10 is a detail sectional view taken on lines 10—10 of Fig. 4.

Figure 11:
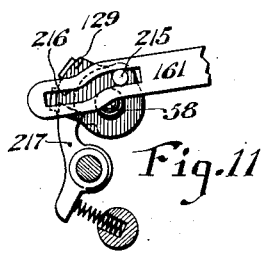

Fig. 11 is a fragmentary sectional view showing the special printing member for normally printing the letters "ST" and means for adjusting it to print the letters "GT" when it is desired to follow the printing of a total by a clearing operation.

Figure 12:
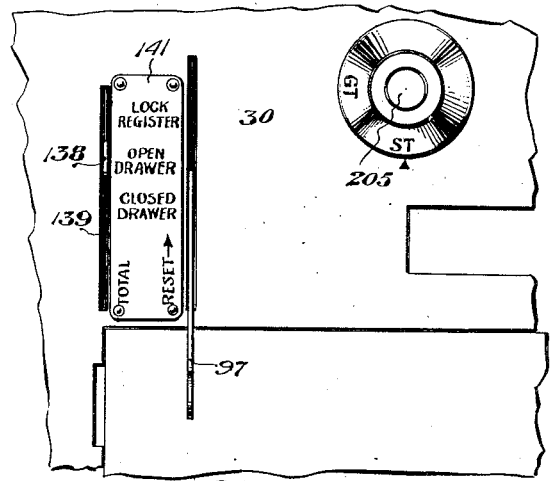

Fig. 12 is a top plan view of a portion of the cabinet cover showing the control lever, the resetting lever and the special knob for controlling identifying character printing.

Figure 14:
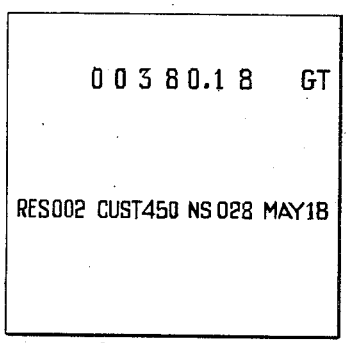
Figure 13:
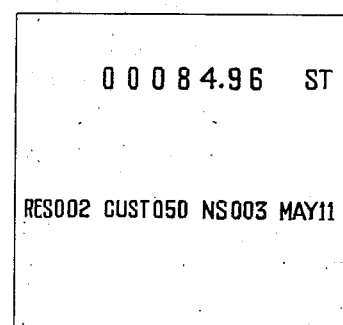

Figs. 13 and 14 are examples of total printing which may be produced by the illustrative machine. The manner in which the special printing member prints the different characters is clearly shown in these figures.

Figure 15:
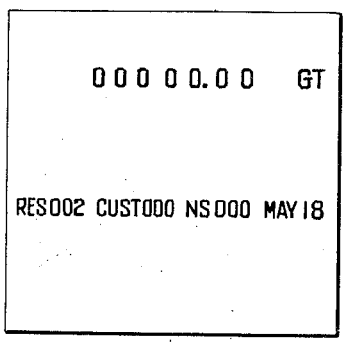

Fig. 15 is an example of printing performed by the machine after the resetting operation has been performed.

For the convenience of description the principal elements of the machine will first be enumerated and their general purposes, arrangement and co-operation will be briefly explained in order to indicate the general operation of the machine as a whole after which the preferred construction of these parts will be described more in detail, together with the function, construction and operation of certain secondary or accessory mechanisms associated therewith.

Briefly stated in general terms the present machine to which the invention is shown applied, is of the key operated type of cash register having a plurality of banks of amount keys and a special operating key designated as the "No sale" key. All of the amount keys operate a differential mechanism for the purpose of inserting the items in a totalizer. As is usual in this class of machines when the keys are operated they drive a power shaft from which the various parts of the mechanisms are operated.

During each operation of the machine a unit is entered in a counter designated as the "Customer" counter and each time that the "No sale" key is operated its associated counter will also be operated. During resetting operations a special "Reset" counter will be operated.

In order to lock the various manipulative devices other than the operating keys against unauthorized operation a hinged cover is provided, which, when securely locked prevents access to said devices, but by the operation of a lock through the insertion of a key carried by an authorized person the hinged cover may be unlocked at any desired time.

In order to print the totals and other information standing upon the totalizer, the special counters and a series of date printing wheels, a suitable printing mechanism is provided which is operated by the depression of a button or knob extending from the front of the printer cabinet, the knob being normally protected against improper manipulation by means of the hinged cover just referred to. The printing mechanism is released for operation by the adjustment of a manipulative device and so long as the hinged cover is lifted and the manipulative device properly adjusted the printer may be operated freely and as many times as is desired by merely depressing the printer knob. Normally a special character is printed upon the record material, which, in itself has a particular significance indicating that no clearing or resetting operation will be performed after the total printing operation. After printing, the paper is simply drawn out and detached from the rest of the roll, through the aid of a suitable tearing edge.

When it is desired to print the totals pertaining to the termination of some arbitrary period at which time the totalizer is to be cleared, the machine is so constructed that this total will be designated in some special manner upon the record material so that the various printed totals may be easily differentiated. In order to print such a total it is necessary in the illustrative machine to adjust a special knob, which knob adjusts the special type printing member so that the letters "GT" will be printed when the printing mechanism is subsequently operated. Adjustment of this special knob will not only serve to release the resetting mechanism and adjust the special type element but will also lock up the operating keys until a subsequent operation of the resetting lever serves to unlock them.

Upon completion of the printing operation which prints the information relating to the termination of a given period, the resetting lever which has been unlocked by the adjustment of the special knob is manipulated so that all the elements of the totalizer and counters will be restored to zero, with the exception of those belonging to the "Reset" counter.

In order to insure that the several manipulative devices are properly operated special interlocking devices are provided so that no two of them can be operated simultaneously. This insures the proper recording of the amounts and the proper performance of the printing and resetting operation.

The general organization and operation of the machine as a whole having been thus outlined, the preferred construction of the various parts above referred to will now be described more in detail.

Framework

The various parts of the mechanism are supported by a suitable framework comprising a base casting 20 (Fig. 1) and parallel side frames 21 and 22 (Fig. 3). Extending between the rearward end of the frames 21 and 22 is a supporting frame 23 utilized to support the indicating and other mechanisms. The side frames 21 and 22 are rigidly connected together at their forward ends by a bar 24. Extending between the supporting frame 23 and the bar 24 and parallel to the frames 21 and 22 are intermediate frames 25 and 26, the front ends of which are bifurcated at 27 (Fig. 7) to engage a shaft 28 passing through ears integral with the bar 24. The upper rear ends of the side frames 25 and 26 rest against the frame 23, while the lower rear ends of the frames 25 and 26 are apertured to receive a shaft 29 (Figs. 5 and 7) which passes through ears integral with the framework 23. The intermediate frames 25 and 26, are furthermore, suitably joined together by means of shafts and further connections which will be referred to hereinafter. As best shown in Fig. 1, the mechanism is enclosed by a cabinet 30 which may be made of any desired material. The cabinet 30 is slotted at 31 to receive the forward ends of a series of key levers and is, furthermore, apertured at its upper end to permit the viewing of the indicators. The printing and other associated mechanisms are concealed by a cover 300 which is rigidly attached to the cabinet 30, but is suitably apertured so as to permit access to certain parts. In order to conceal and prevent unauthorized persons from having access to the printing devices, as well as various manipulative controls including a special printing control knob and a resetting lever, there is provided a cover 32 hinged to the cabinet 30 and so arranged so that when this cover is locked access cannot be had to any of the devices just mentioned.

Keys and key coupler

The illustrative machine is provided with a number of keys 34, (Figs. 1 and 3) one group for registering amounts from 1¢ to 9¢, another group ranging from 10¢ to 90¢ and the third for registering values of $1 and $2 amounts. If desired, additional keys may, of course, be provided. A special key 33 is also shown and designated as the "No sale" key, the function of which is to release the cash drawer when it is desired to make change, &c. The amount keys 34 and the "No sale" key 33 are pivoted upon the shaft 35 (Fig. 1) journaled in and extending between the side frames 21 and 22, and resting upon the rear ends of the keys is a key coupler 36 provided with a nose 37 co-operating with notches 38 formed in the rear ends of the keys. When the forward ends of the operating keys are depressed the key coupler is rocked clockwise and the nose 37 enters the notches 38 of the depressed keys while it passes in front of the locking edge 381 of undepressed keys.

Connected to the key coupler at 39 is a vertically reciprocating rack plate 40 (Fig. 1) provided with oppositely facing rack teeth 41 which alternately mesh with a gear 42 (Fig. 3) fast to a shaft 43. The arrangement of this mechanism is such that a reciprocation of the key coupler 36, by the operating keys, will effect a complete rotation of the gear 42 and the shaft 43. This mechanism is well known in the art, and, therefore, need not be described in further detail; reference may be had to the patent to Carney, 786,346, April 4, 1905, for further details.

After a registration has commenced it is essential that some device be provided to compel the complete performance of the started registration before a second operation can subsequently be effected. To this end any suitable mechanism may be provided and in the present instance it comprises a spring-pressed pawl 44 (Fig. 3) bearing against a ratchet wheel 45 secured to the main operating shaft 43.

Differential mechanism

The differential mechanisms or devices controlled by the various groups of keys for entering the desired amounts in the totalizer are all similar in construction and principle and a description of one will suffice for all.

Each amount key 34 associated with the dimes group of keys (Fig. 1) is provided with an upwardly extending arm 46 carrying a suitable anti-friction roller 47 co-operating with a differential slot 52 formed in a cam plate 48. Loosely mounted upon the transverse shaft 49, which is journaled between the machine side frames is a frame 50 provided with spaced slots in which are secured by means of pins 51 a series of cam plates 48. Fig. 3 of the drawings shows the relation between the operating keys associated with the pennies bank and the related series of cam plates 48, which, are carried by the supporting frame 50.

The cam plates 48 are provided with L-shaped slots 52 and 53, the slots 53 being concentric with respect to the shaft 49. The slots 52, are, however, graduated so that when the roller 47 carried by the arm 46 of a depressed key co-operates with the cam slot 52 of its associated cam plate 48 it will move the frame 50 differentially and to an amount commensurate with the value of the key depressed. When, however, the frame 50 is rocked by the depression of a key 34 of a certain group the rollers 47 related to the undepressed keys of that group will play in the arcuate slots 53 of their respective cam plates 48 thereby permitting the frame 50 to be rocked differentially without interference with the rollers 47 of the unoperated keys.

It is to be understood that there is a differential frame for each group of amount keys and that the differential frame associated with each of the three groups of keys has attached thereto a segmental rack 54 (Fig. 1). From the above, it will be evident that since there may be nine keys in a particular group and a corresponding number of cam plates 48, the segmental rack 54 may be rocked to any one of nine different positions by the depression of a key 34 associated with such group of keys. Depression of keys in two or more groups will similarly adjust their associated segmental racks differentially so that this movement can be transferred to the totalizer pinions in a manner which will now be described.

Totalizer engaging mechanism

The totalizer embodied in the machine as shown in the drawings comprises a frame 55 (Figs. 1, 3 and 4) which is journaled in the intermediate frames 25 and 26 by means of journal pins 56 (Fig. 4) passing through the intermediate frames 25 and into sockets formed in the totalizer frame. These pins are the pivotal points of the totalizer frame 55 and the frame is adapted to be rocked about this point as a center to bring the totalizer pinions into mesh with the actuating racks 54 at the proper time. The totalizer may be made up of any desired number of numeral elements, but as illustrated comprises a series of seven wheels 57 loosely mounted upon a shaft 58 (Fig. 1) journaled in the totalizer frame 55. The peripheries of these wheels are formed with raised characters so as to effect printing upon a suitable impression material. Each printing wheel 57 has attached thereto a pinion 58' the three lower order ones of which are adapted to mesh with the teeth of the segmental racks 54 hereinbefore referred to.

In order to mesh the pinions 58' with the segmental racks 54 the following mechanism is provided, reference being had particularly to Fig. 5. Slidably mounted on the left hand journal pin 56 is a bar 59 which is connected at its rear end to about the mid-point of an arm 60 pivoted to a stud extending from the left intermediate frame 25. The lower end of the arm 60 carries a roller adapted to engage a slot formed in a box cam 61 fast to the rotation shaft 43, while the forward upper end of the bar is bifurcated to engage the shaft 58 which, it will be remembered, carries the totalizer wheels and pinions.

During the downward stroke of the keys the shaft 43 will be rotated clockwise, as viewed in Fig. 5 and due to the configuration of the slot in the box cam 61 the bar 59 will be drawn rearwardly early in the depression of the keys so as to rock the totalizer frame 55 about its pivotal point 56 to bring the totalizer pinions in mesh with the racks 54 which are then differentially operated under control of the keys as before explained. During the return strokes of the keys the box cam will again act upon the bar 59 forcing it forward, thereby withdrawing the totalizer pinions from engagement with the actuating racks 54 and leaving the pinions 58' in their differentially adjusted positions.

On machines of the class under consideration it is also essential that transfer devices be provided for carrying a unit from a lower to higher order wheel of the totalizer and any suitable means may be provided for this purpose. Inasmuch as this mechanism forms no part of the present invention it will not be described herein.

Date printing wheels and associated setting devices

It is desirable when the total amount of the sales and other information is printed upon a record bearing material that some means be provided to designate the date to which the information pertains or in some cases to show the end of some arbitrary period to which it relates. For this reason the present register includes a series of date setting devices in the form of adjustable wheels 68 (Figs. 1, 3 and 4) which project through an aperture formed in the cabinet 30, and which are normally protected against improper manipulation by means of the hinged cover 32 previously referred to. The date setting wheels 68 which are adjustable to set up the days as well as the names of the months are, loosely mounted upon a shaft 69 which is fastened at its extreme ends to the intermediate frames 25 and 26. Each wheel 68 has integral therewith a pinion adapted to mesh with the teeth of a co-operating pinion 70 (Fig. 1) which is loosely mounted upon a stub shaft attached to the side frame 26. The intermediate pinions 70 likewise mesh with pinions of printing wheels 71 (Figs. 3 and 4) which are loosely mounted upon a shaft 72 passing between the intermediate frames 25 and 26. The date printing wheels 71 are also provided with raised type so that they may be utilized for the purpose of effecting printing upon the record material.

In order to hold the type wheels in their adjusted positions, there is provided a series of spring-pressed aligning pawls 73 (Fig. 4) of the usual type and well known in the art. By means of the setting wheels 68 the date printing wheels 71 may be adjusted to print the desired date upon the record bearing material when the printing mechanism is operated.

*Special counters*

The special counters are of the multiple pawl deep-notch transfer type, well known in the art and described in many patents, one of which is the patent to Thos. Carney, No. 876,295, dated January 7, 1908. The consecutive numbering counters are all mounted in one line on the shaft 72, which, it will be recalled, supports the date printing wheels.

The "Customer" counter which is situated between the "No sale" and "Reset" counters comprises four wheels 74 (Figs. 1, 3 and 4), the peripheries of which are formed with raised printing characters and these wheels have attached thereto ratchet wheels 75 cooperating with a multi-prong actuating pawl 76 (Fig. 1). The actuating pawl 76 is spring-pressed and pivotally mounted by means of a pin 77 in a bail 78 loosely mounted upon the shaft 72. The bail 78 has attached thereto a pin 79 (Figs. 2 and 4) co-operating with a slot formed in a bell-crank 80 loosely mounted on a shaft 81. The lower end of the bell-crank 80 is connected by means of a pin and slot connection to a second bell-crank 82 loosely mounted upon the shaft 49 and bifurcated at its extreme rearward end to co-operate with an eccentrically mounted disk 83 fast to the shaft 43. From the above, it will be evident that when the shaft 43 is rotated by means of a depression of a key the bell-crank 82 will be rocked and through the cooperating bell-crank 80 will rock the bail 78 and through the actuating pawl 76 insert a unit in the "Customer" counter.

The "No sale" counter which is just to the right of the "Customer" counter (Fig. 4) is formed of three wheels 84, the peripheries of which are formed with raised printing characters and these wheels also have attached thereto ratchet wheels co-operating with a multi-prong pawl 85, (similar to the pawl 78 described in connection with the "Customer" counter). The actuating pawl 85 is carried by a bail 86 to which is attached a pin 87 co-operating with an arm 88 (Figs. 1 and 4) rigidly secured to the shaft 81. As best shown in Fig. 2, the shaft 81 passes through the frame 25 and is journaled at its left hand end in the side frame 21 and has attached thereto a second arm 89 (Figs. 3 and 7) which is connected to the "No sale" key 33 by means of a link 90. From this it will be understood that when the "No sale" key is operated the shaft 81 will be rocked and by means of the arm 88 and its connections to the bail 86 of the "No sale" counter, the actuating pawl 85 will be operated thereby adding a unit to this particular counter.

The counter to the left of the "Customer" counter (Figs. 3 and 4) is known as the "Reset" counter and is provided for the purpose of registering the number of times that the resetting operations have been performed.

As is best shown in Figs. 3 and 4, the bail 91 which is associated with the "Reset" counter wheels 92 is provided with a laterally extending lug 93 which is in the path of the pin 79 attached to the bail 78 associated with the "Customer" counter. The bail 91 has attached thereto a laterally extending pin 94 which, as best shown in Fig. 5, is in the plane of a double arm 95 loose upon the shaft 81. The rearward portion of the arm 95 is connected by means of a link 96 to a resetting lever 97 loosely mounted upon the shaft 49. It will be observed from Figs. 5 and 7, that when the resetting lever 97 is forced rearwardly from the position shown, in order to accomplish a resetting operation as will be hereinafter described in detail, the arm 95 will be rocked counter-clockwise and due to its cooperation with the pin 94 will move the bail 91 from the position shown in Fig. 3 to the position shown in Fig. 4, the last mentioned figure showing the lug 93, directly contacting with the pin 79 of the "Customer" counter. When the bail 91 was moved forwardly the pawl associated with the "Reset" counter merely slipped idly over the ratchet wheels, and it is obvious, that the resetting lever could have been operated as many times as desired without disturbing the bail 91 after it has been once adjusted to the position shown in Fig. 4.

When the machine is subsequently conditioned for an item entering operation and a key is depressed, the "Customer" counter will be operated in the usual manner. Since the bail 91 associated with the "Reset" counter has been forced upwardly and forwardly to bring it in line with the bails 78 and 86 associated with the two remaining counters, the pin 79 contacts with the lug 93 and forces the bail 91 downwardly and rearwardly to its normal position and thereby adds a unit to the "Reset" counter. It will be clear, therefore, that the resetting lever merely cocks the operating means and the unit is only entered whenever the machine is subsequently operated.

Adjacent to each of the special counters and mounted loosely upon the shaft 72 is a special printing member 126 (Fig. 4) which serves to identify its particular counter.

*Printing mechanism*

In cash registers of the class shown and described, the total amount of the sales registered and other information is frequently obtainable only by reading the amount standing upon the totalizer elements and other registering devices. It is preferable, however, to have this information printed upon a record bearing material as it then forms a permanent and unchangeable record which may be referred to at any desired time. For this reason the illustrative machine is provided with a simple and effective printing mechanism for printing the desired information on a strip of paper.

In general, the printing mechanism comprises a printing frame which is pivotally mounted and adapted to be manually swung about its pivot by the use of a knob or key to carry a pair of impression elements against the two lines of printing type already described. The frame is normally spring-held in its outward position and is provided with suitable inking devices and means for carrying and guiding a record strip. As has already been explained the locked cover 32 normally conceals and prevents access to the printing mechanism.

The construction of the various elements of the printer will now be described generally, but not in detail, since it forms no part of the prevent invention. However, for details of construction and further explanation, reference may be had to applicant's co-pending application Serial No. 13,470, filed March 6, 1925.

Referring to Figs. 1, 5, and 7, it will be noted that the printing frame comprises a plate 100 integral with which are two side plates 101 and 102 (see Fig. 3) the lower ends of which are apertured to receive the shaft 28. All the associated devices for effecting printing are carried by the frame just referred to. Journaled in the side plates 101 and 102 at their upper portions is a shaft 103 forming the pivotal point of a platen 104 provided with two parallel rubber impression blocks 105. The ribbon supporting frame comprises two parallel plates 106 and 107 which may be attached to each other by any suitable means. Attached to the plate 107 is a pair of lateral plates 108 (one of which is shown in Fig. 7) substantially at right angles to the plate 107 and formed with elongated slots 109 to receive the platen supporting shaft 103.

It will be noted from an inspection of Fig. 5, that the supporting plates 106 and 107 are suitably bent so as to form channels 110 located just in line with the impression blocks 105 for the reception of the ribbon carrying frames or plates 111 in which are held or fixed, across suitable apertures, strips of inking ribbon 112. A ribbon frame is provided for each printing line so that each can be removed or replaced independently of the other.

Referring to Fig. 1 it will be noted that the ribbon supporting plate 107 extends downwardly and is curved. Also extending between the side plates 101 and 102 and curved similarly to the lower portion of the plate 107 to form a narrow passage therewith is a curved plate 113 (see also Fig. 3) which serves as a support for the roll of paper. As best shown in Fig. 7, the paper strip is drawn from a roll 114 and one end is inserted between the plates 107 and 113 and guided over the rear faces of the rubber impression blocks 105 after which it is guided over the upper curved portion 115 of the plate 107 so that it passes forwardly under a plate 116 which is riveted or otherwise secured to the side plates 101 and 102 and formed at its upper forward edge with serrations 117 adapted to facilitate tearing of a section of the record strip from the rest of the roll. As shown in Fig. 7, it will be noted that the plate 100 is cut away at 118 so as to permit the insertion of a finger to grip the upper portion of the record strip and draw it outwardly before detaching a section of it from the rest of the roll.

The relation of the printing devices to the cabinet is best shown in Figs. 1 and 8, and from the first mentioned figure it will be noted that the cover 300 is apertured at its lower end at 119 to permit the insertion of the record strip supply roll, while at its upper end the cover has an aperture 120 in line with the opening 118 of the plate 100 to permit the insertion of a finger to draw out the printed record strip. The side portions of the cover 300 are each provided with a pair of elongated apertures 121, such as shown in Fig. 8. These are provided for the purpose of permitting the insertion of a new ribbon frame in the printer while the printer is in its normal position. When the printing mechanism is so positioned and it is desired to replace an old ribbon frame, a new one is merely inserted in the proper aperture 121 and by forcing it laterally the old frame will be ejected from the opposite end sufficiently to permit its withdrawal by the fingers so that the printer may then accommodate the new ribbon frame.

In order to retain the printer in its forward or normal position the side plate 101 has attached thereto by means of a lug 122 (Fig. 8) a bell-crank 123 loosely pivoted upon the pivotal shaft 28 of the printer. The tension of a spring 124 attached to the horizontal arm of the bell-crank 123 normally retains the printing devices in the position shown in the drawings.

In order to permit the printing mechanism to be forced rearwardly so as to take a printing impression from the adjusted type carriers, there is provided a button 125 (Figs. 1 and 7) which is slidably mounted in the cover 300 and has its rearward portion contacting with the plate 100.

Let it be assumed that the cover 32 has been raised so as to permit access to the printing devices and that the record strip has been properly inserted and that the ribbon frames are also in their proper positions. If the printing button 125 is now depressed it will force the entire printing frame rearwardly, tensioning the spring 124 (Fig. 8). As the printing frame is forced rearward against the type the ribbon supporting plate 106 will contact with forward projections 128 (Figs. 5 and 7) of the intermediate frames 25 and 26, thereby holding the inking ribbons and their supporting plates against further movement. As the printing button is depressed still further the side plates 101 and 102 will, through the shaft 103 continue to force the platen rearwardly. At substantially this point of the operation the lower impression block 105 will contact with the totalizer elements thereby holding the lower portion of the platen rigid and forcing the platen to rock slightly counter-clockwise as viewed in Fig. 5, so as to permit the upper impression block 105 to strike the special counter printing elements with the result that the printing elements of the two printing lines are struck with substantially equal force. It will be understood that the rubber platen blocks will force the paper against the inking ribbons and adjusted type so that the impression will be made upon the strip of paper.

After the impression has been made the index finger may be inserted in the aperture 118 provided for that purpose, and a portion of the printed record strip may be withdrawn and detached from the rest of the roll.

Referring now particularly to Fig. 13, there will be seen an example of printing adapted to be performed by the illustrative machine. The upper line represents the total amount of the cash sales for some arbitrary period and parallel to this printing line is printed the information which is contained upon the special counter and date printing wheels. It will be noted from Fig. 13 that the abbreviation "N. S." identifies the amount printed by the "No sale" counter, while the abbreviation "CUST" identifies the amount printed by the "Customer" counter and the abbreviation "RES" identifies the amount printed by the "Reset" counter. Located adjacent to the numerals printed by the totalizer printing elements are the characters "ST" which are printed by a special printer member 129 (Figs. 3, 4, 8 and 11) and which comprises a portion of the present invention, which will be explained in detail hereinafter.

Drawer release by an operation of the machine

In machines of the type illustrated it is customary to provide a cash drawer which is released upon each operation of the machine and ejected outwardly under the action of a spring to expose the same for the purpose of making change or receiving the money tendered. To this end the machine is provided with a cash draw 130, (Fig. 1) suitably guided in a drawer base and normally urged outwardly by the usual drawer spring 131. The drawer, however, is retained in its innermost position by a drawer catch 132 engaging a portion of the cash drawer and which is pivoted to a short shaft 133 to which is attached a forwardly extending arm 1331 (Fig. 1) connected to a link 134 (Fig. 7) carrying a roller 135 co-operating with a cam 136 fast to the rotation shaft 43. The roller 135 is urged against the periphery of the cam 136 by means of a spring 137.

When the shaft 43 is rotated by an operation of the keys the cam 136 will elevate the link 134 and through the train of mechanism just described disengage the drawer catch 132 permitting the drawer spring 13 to eject the cash drawer. The profile of the cam 136 is such that the cash drawer will be ejected during the return stroke of the keys which is after the completion of the registering operation.

Control lever

In the type of machine shown in the drawings it is a common expedient to provide means whereby the keys are locked against operation while the cash drawer is exposed and thus the operator is forced to close the cash drawer at the end of each operation so as not to leave the money contained therein exposed between operations of the machine. The purpose of such constructions is also to compel the operator of the machine to make some record or indication before access to the money contained in the drawer may be had. In certain uses of the machines, it is desirable to disable the mechanism just described so as to permit successive operations of the machine during rush hours without closing the cash drawer after each operation. Again it is desirable at times to lock the operating keys irrespective of the position of the cash drawer so as to prevent tampering by unauthorized persons.

The illustrative machine is provided with mechanisms for accomplishing the objects just stated, but they do not comprise any portion of the present invention and are merely illustrated as an incident to explaining certain features of the present invention. They will, therefore, be described here only generally and for further details of construction reference may be had to applicant's co-pending application Serial No. 13,470, filed March 6, 1925, previously mentioned.

To provide for the functions just stated, the mechanism embodied in the illustrative machine is placed under the control of a single lever located under the hinged cover 32. When the latter is locked access to the lever cannot be had except by persons having the key of the lock for the cover. The control lever is adapted to be shifted to accomplish any one of the functions above mentioned, and it also has another position known as the "Total" position which releases the cash drawer and conditions the entire machine for total printing, and in combination with other devices permits a resetting operation to be performed.

As best shown in Fig. 7, the control lever 138 is loosely mounted upon the shaft 49 and is guided in its reciprocating movement by means of a slot 137 (Fig. 3) formed in a plate 140 riveted to the intermediate frame 25. The control lever 138 projects through a slot 139 formed in the cabinet 30 (Fig. 12) which has attached thereto an index plate 141 which carries legends designating the various positions of adjustment of the control lever.

Let it be assumed that the control lever is unlocked for operation by means which will hereinafter be described, and that it has been moved to the "Closed drawer" position (Fig. 7) in order to adjust the mechanism so that it requires the closing of the cash drawer before the keys can subsequently be operated. The mechanism for accomplishing this function will now be described in detail, reference being had particularly to Fig. 7.

There is loosely pivoted upon the shaft 29, previously mentioned, a locking arm 142 which is provided with a shoulder 143 adapted to co-operate with the flange 37 of the key coupler 36 at certain times and extends further downwardly so as to contact with the rear end of the cash drawer 130. Also loosely mounted upon the shaft 29 is a second locking lever 144 which is also provided at its lower end with a shoulder (similar to the shoulder 143) and also adapted to engage the flange of the key coupler, but this locking arm in addition has an upward extension 145 formed with a slot 146. It will be noted that while the levers 142 and 145 are mounted independently of each other they are drawn together by means of a spring 147, the relative movement being regulated by means of a stud 148 attached to the lever 145 contacting with the forward edge of the locking lever 142. It will be noted that the lower end of the spring 137 (previously described in connection with the drawer release devices) is connected to a pin 149 carried by the locking lever 142 and hence tends to rock the levers 142 and 144 until their lower shoulders engage the nose 37 of the coupler.

In Fig. 7, the co-operating parts are shown in the position they assume when the control lever 138 is adjusted to the "Closed drawer" position with the cash drawer already returned thereby freeing the keys for a subsequent operation due to the engagement of the rear end of the drawer with the lower end of lever 142. When the keys are again operated and the cash drawer released it will be obvious that the lower end of the lever 142 will no longer contact with the cash drawer and that the tension normally existing in the spring 137 will rock the locking lever 142 counter-clockwise as viewed in Fig. 7 and due to the inter-connecting spring 147 as well as the engagement of the stud 148 both levers 142 and 144 will move as a unitary structure bringing their respective locking shoulders over the flange of the key coupler, thereby locking the key coupler and keys against operation as long as the cash drawer remains open. However, when the cash drawer is forced inwardly the rear end of the latter will contact with the lower end of the lever 142 rocking both locking levers rearwardly to unlock the key coupler and slightly tensioning the spring 137. The parts are then again in the position shown in Fig. 7 in which they permit a subsequent operation of the keys.

In order to disable the above described automatic locking mechanism for the keys the control lever is moved one step rearwardly from the position shown in Fig. 7. As shown in this figure the rearward extension of the control lever carries a pin 150 adapted to co-operate with the slot 146 in the lever arm 145. When the control lever is moved rearwardly one step, the pin 150 will be brought to bear against the forward bevelled edge of the slot 146 and positively hold the locking levers in the position shown in Fig. 7. Thus, it will be obvious that when the machine is operated and the cash drawer is ejected so as to relieve the contact between the lever 142 and the rear end of the cash drawer, the tension in the spring 137 cannot urge the levers to locking position, since they will be positively held back by means of the pin 150. The machine is thus permitted to be operated successively, irrespective of the position of the cash drawer. It will be understood that the stud 148 carried by the lever 145 serves to hold back the lever 142.

Whenever it is desired to positively lock the keys against operation it is only necessary to move the control lever two spaces rearwardly from the position shown in Fig. 7 so that it is brought to the position designated on the index plate 141 (Fig. 12) as "Lock register". Movement of the control lever to this position brings the pin 150 to cooperate with the rearward edge of the slot 146 to positively move the locking lever 145 to bring the locking shoulder of its lower arm 144 over the flange or nose of the key coupler. By this means when the control lever is left and locked in this extreme rearward position the keys will be locked against operation and it will be impossible to obtain access to the contents of the cash drawer by operating the keys.

The control lever 138 is capable of being moved to still another position known as the "Total" position. When the control lever is brought forwardly to this position, as shown on the index plate 141 (Fig. 12) a number of functions are performed. These will be taken up in a subsequent section.

Control lock

During the description which has previously been given, reference has been made to a hinged cover 32 which conceals and covers the various manipulative devices. As has already been indicated it is desirable to have this cover locked and to this end the machine disclosed is provided with a lock which releases the cover to render access to the different manipulative devices. This lock as shown in Fig. 3 and identified by reference character 151 is attached to a plate 152 which, in turn, is carried by the rear frame 23. The upper portion of the lock projects through the cabinet so as to permit the rotation of the barrel of the lock by the insertion of a suitable key. The barrel of the lock has attached thereto a cam 153 (see also Fig. 9) co-operating with pins 154 and 155 carried by a shiftable shaft 156 passing through holes formed in the intermediate frames 25 and 26. It will be clear that when the key is inserted in the lock and the barrel is turned the cam co-operating with the pin 155 will shift the shaft to the right as viewed in Figs. 2 and 9.

In order to guide the shaft 156 in its reciprocating movements and prevent it from rotating in the frames 25 and 26, there is attached to the shaft an arm 157 carrying a pin 158 working in an aperture in the side frame 26.

Co-operating with a square notch in the shiftable shaft 156 is a bell-crank 159 which is pivoted to a rod 160 attached to the frame 25. One arm of the bell-crank projects through an aperture formed in the frame 26 and projects into a hole formed in a slidable plate 161 (Fig. 8) guided by studs 162 carried by the side frame 26. The sliding plate 161 is provided with an extension 163 which passes through a slot in the cabinet 30 just at the right side of the cover 300 so that the extension normally rests between the inside of cover 32 and the side of the printer cover 300. In order to hold the cover 32 latched there is provided a spring operated catch 164 (Fig. 8) which is pivoted at 165 to the inside of cover 32. The catch 164 is urged by a spring 166 so as to normally engage a stud 167 carried by the cover 300. Integral with the catch 164 is a projection 168 adapted to co-operate with the extension 163 of the slide 161.

To summarize the operation of the above, it will be evident that when the correct key is inserted in the lock and the barrel is turned in a counter-clockwise direction (as viewed in Figs. 3 and 9) the action of the cam 153 upon the pin 155 will be such as to shift the shaft 156 to the right. This will rock the bell-crank 159 clockwise so as to force the plate 161 (Fig. 8) forwardly and through the camming action of the extension 163 on the projection 168 of the catch 164 will serve to disengage the hook portion from the stud 167. The cover 32 is now unlocked and may be raised to permit access to the various manipulative devices which it normally conceals.

It will be apparent that if it were possible to fraudulently elevate the cover 32 without operating the lock, the key of which is only retained by authorized persons, it would be possible for unauthorized persons to obtain access to the control lever 138 and move it to different positions to perform the various functions over which it is capable of exercising control. For this reason the illustrative machine is also equipped with means whereby the control lever will be locked against operation unless the barrel of the lock is rotated. As shown in Figs. 6 and 9, the shaft 156 is provided with a slot 169 which is normally out of the plane of the control lever 138. The upper edge of the control lever 138 is scalloped to form three semi-circular notches 170 (Fig. 7) which are associated with the three rearmost positions of the control lever. When the shaft 156 is being shifted to release the cover 32 it will bring the slot 169 in the plane of the control lever 138 permitting it to be moved to any position. After the control lever has been moved to any of the three rearmost positions it can be locked again by moving the shaft in the reverse direction by the rotation of the barrel of the lock. It will be noted that the control lever is not provided with any semi-circular notch 170 corresponding to the foremost of the "Total" position of the lever and it cannot, therefore, be locked in this position.

Locks and interlocking mechanism

It is desirable whenever the control lever 138 is in any position but the "Total" position that the printing mechanism and the resetting lever be locked against operation. The side plate 101 of the printer is for this purpose provided with a locking lug 171 (Figs. 5 and 7) adapted to cooperate with the locking edge 172 of a double arm member 173 attached to a shaft 174 passing through the intermediate frames 25 and 26 and which has attached at its other end a locking arm 175 (Fig. 8) provided with a locking edge 176 adapted to co-operate with the locking lug 122 previously referred to. From the above, it will be quite clear that if an attempt were to be made to move the printer by operating the button 125 it would normally be stopped by the lugs 122 and 171 contacting with the associated locking surfaces of the arms 175 and 173, respectively.

In order to lock the resetting lever 97 against operation whenever the control lever 138 is in any position except the "Total" position, the following means is employed. The resetting lever 97 has connected thereto by means of a pin 177 a member 178 (Fig. 5) bifurcated at its forward end to form an open-ended slot 179 to engage the shaft 174 and in addition it is provided with a notch 180 co-operating with a stud 181 carried by the rearward end of the double arm 173. The control lever 138 has also attached thereto a member 182 which is provided with an inclined slot 183 embracing the shaft 174 and in addition, has a portion of its lower edge 184 substantially parallel to the incline of the slot 183. As shown in Figs. 5 and 7 the bevel edge 184 contacts with the pin 181.

From the above, it will be evident that if an attempt is made to move the resetting lever 97 rearwardly from the position shown, while the control lever is in the "Closed drawer" position, it will be prevented by the contacting of the pin 181 with the forward edge of the slot 180. If there is any tendency of the wall of the slot to cam the pin 181 upwardly out of the slot 180 it will be frustrated by the contact of the pin 181 against the inclined edge 184. If the control lever is moved to any of the next two rearmost positions "Open drawer" or "Lock register" the bevel edge 184 will still contact with the pin 181 and lock the resetting lever against rearward movement.

The printing mechanism is unlocked for operation whenever the control lever 138 is directly moved to the "Total" position and just how this is performed will now be described.

As shown in Fig. 7, the member 182 is provided with an extension 185 co-operating with a pin 186 carried by the forward end of locking element 173. When the control lever 138 is moved forwardly one step from the position shown in Fig. 7 the connected member 182 also will be moved forwardly and downwardly due to the incline in the slot 183 so that the projection 185 will force the stud 186 downwardly and thereby rock the locking member 173 in a clockwise direction. This will bring notches 187 (Fig. 7) and 188 (Fig. 8) formed in their respective locking arms 173 and 175, to register with the locking lugs 171 and 122, respectively. The printing devices can now be moved rearwardly to effect a printing operation.

Whenever the control lever is brought to the "Total" position an integral extension 189 (Fig. 7) will contact with a stud 190 attached to the drawer release link 134 so as to operate the drawer catch 132 to release the cash drawer independently of an operation of the machine.

The resetting lever 97 is normally locked by two locking devices, one of these being controlled by the control lever 138 and the other by means of a special device which comprises a part of the present invention. The manner in which the control lever 138 disables one of the locking devices to unlock the resetting lever 97 for operation is as follows:

When the extension 185 (Fig. 7) co-operates with the stud 186 to rock the locking arm 173 clockwise it forces the pin 181 upwardly out of the slot 180, thereby unlocking the resetting lever for operation, so, therefore as far as this locking mechanism is concerned, the resetting lever 97 will be unlocked for operation whenever the control lever is moved to the "Total" position.

The manner in which a resetting operation is performed will be taken up and described in a subsequent section.

*Interlocking mechanism between printer and operating keys*

As premised hereinbefore, movement of the control lever to the "Total" position will permit the printing of the totals and other information. While the mechanism as thus far described is substantially complete and practically operative it is necessary to include other devices which may be called precautionary devices so as to prevent any possible mis-operations of the machine.

To this end it is desirable while printing is being performed that the operating keys be locked as long as the printer is in the printing position and it is, furthermore, necessary in order to prevent fraudulent printing operations, to prevent printing during the registering operation by the operating keys.

When the control lever 138 is drawn forwardly one step (Fig. 7) to the "Total" position to unlock the printer it will be seen that a stud 191 carried by a projection integral with the rearward end of the control lever will co-operate with a cam surface 192 formed on the upper end of the locking lever 145. This will rock the locking lever 145 counter-clockwise (as viewed in Fig. 7) to such a position that the locking shoulder carried by its lower arm 144 will engage the flange of the key coupler 36 and lock the registering keys against operation as long as the control lever remains in the "Total" position.

While a printing operation is being performed it is apparent that as the printer is moved rearwardly from the position shown in the drawings the engagement of the lug 171 with the slot 187 (Fig. 7) and lug 172 with notch 188, (Fig. 8) will serve to hold the locking members 173 and 175 rigid and, if an attempt is made to move the control lever out of the "Total" position it will be blocked by a bevel edge 193 formed on the underside of the member 182 engaging the stud 181. Since the control lever 138 is thus locked against any movement it will, of course, be impossible to move it out of "Total" position to unlock the operating keys so long as the printer is displaced from normal position.

*Resetting devices*

At the termination of a day's business or some other arbitrary period, it is usually desirable that the various registering elements be turned to zero to prepare them for the separate registration of the sales to be accumulated during a subsequent period. To this end the illustrative machine is provided with the resetting lever 97, previously mentioned, which, when given a complete reciprocation will reset the various elements to their zero positions.

As best shown, in Fig. 12, the resetting lever projects through and works in a slot formed in a portion of the cabinet 30 which is under the cover 32. The resetting segment 97 (as shown in Figs. 5 and 7) is loosely mounted upon the shaft 49 and is provided with a forward extension 194 formed with rack teeth meshing with the teeth of a gear 195 (see also Fig. 4) loose upon a stub shaft 196 rigidly secured to the side frame 25. The pinion 195 has attached thereto at one side a larger pinion 197 meshing with a pinion 198 loosely mounted upon the shaft 72, which, it will be recalled, supports the consecutive numbering counter wheels. Also connected to the pinion 195 at its other side, is a bent disk 1981 which co-operates with a spool 199 pinned to the shaft 58, which, it will be recalled, supports the totalizer elements. Attached to the spool is a gear 200 which is normally out of the plane of the pinion 195 with which it is adapted to mesh at certain times. From the above, it will be evident that when the resetting segment rotates the gear 195, the pinion 197 and the bent disk 1981 will rotate as a unit. It will, furthermore, be noted from an inspection of Figs. 4 and 10, that the pinion 198 has integral therewith a semi-annular rib 201 which co-operates with a lateral projection 202 integral with a collar 203 pinned to the shaft 72. Due to the normal relationship between the semi-annular rib 201 and the lug 202 the pinion 198 can be given an idle movement before the rib contacts with the lug 202 to rotate the collar 203 and the shaft 72.

As more fully disclosed in applicant's copending application Serial No. 13,470 previously mentioned, in order to reset the totalizer elements to zero each is provided with a pivoted pawl which is spring-pressed against the shaft 58 which in turn is provided with a series of notches one for each wheel of the totalizer. The resetting pawls are normally out of the path of the associated notches, but when the shaft 58 is shifted, as will be explained, the notches and pawls are brought into co-operative relationship and when the shaft 58 is turned the notches will contact with the ends of the pawls and pick up the totalizer elements in whatever position they may be standing at the beginning of the movement of the shaft and carry them around with it so that a complete revolution of the shaft in such direction will serve to reset the totalizer elements to zero.

The shaft 72 which carries the special counters is provided with a series of notches similar to those in the totalizer shaft. The notches, however, are normally in the plane of the resetting pawls carried by the elements associated with the "Customer" and "No sale" counters so that this shaft need not be shifted laterally to reset these counters. The "Reset" counter wheels 92 (Fig. 4) are not provided with any resetting pawls or associated notches in the supporting shaft 72 so that when the shaft 72 is rotated the "Reset" counter elements will not be restored to their zero positions, but will continue to accumulate elements whenever the resetting lever and the operating keys are operated alternately. The foregoing resetting construction forms no part of the present invention and therefore need not be described in further detail here but reference may be had to applicant's earlier case for a full disclosure.

Assuming that the lever 97 is unlocked for operation, it will be obvious that when it is moved from the position shown in Figs. 5 and 7 the teeth of the segmental rack 194 carried by the lever will rotate the pinion 195 and the bent disk 1981, and due to the camming action of said disk upon the collar 199, the shaft 58 will be shifted to bring the pinion 200 into mesh with the teeth of the pinion 197, a part of which are mutilated to allow for this shift, and, furthermore, to bring the resetting pawls and notches into co-acting relationship.

During this time the gear 198 will have been moved counter-clockwise, as viewed in Fig. 10, until one end of the semi-annular rib 201 contacts with the lug 202 carried by the collar 203 (Fig. 4). At substantially the time that the teeth of pinions 200 and 197 are in engagement the rib 201 will have been rocked sufficiently to contact with the lug 202 so that a further rearward movement of the resetting lever will, through the train of mechanism described rotate the shafts 58 and 72 to bring the notches in the latter into co-operation with the pick-up pawls carried by the totalizer and the two special counter elements to restore them to their zero positions.

After the resetting lever has been forced rearward fully it is again returned to its normal position which will return the resetting shafts 58 and 72 backwardly to normal without affecting the position of the registering elements.

It will be understood that at the beginning of the return stroke of the resetting lever there will be a lost motion between pinion 198 and the shaft 72 until the semi-annular ring 201 engages the opposite face of the lug 202, and that towards the end of the return stroke of the lever 97 the shaft 58 will be laterally restored to normal. When the resetting lever is at its home position the parts will again stand in the position shown in Figs. 5 and 7.

Special character printing

As has been stated hereinbefore, the printing mechanism is normally inoperative, but when the bolt of the lock 151 is rotated and the hinged cover raised and the unlocked lever is adjusted to the "Total" position, the printing button may be depressed to take an imprint from the characters presented at the printing lines by the various printing elements. This permits the operator of the machine to obtain the information regarding the amount of sales for a certain period, as well as the other data of which a record is made. In order to indicate the different kinds of totals which may be printed upon the record strip the special character printing element 129, previously referred to, is provided. In its normal position (Figs. 4 and 11) it is adapted to print the characters "ST" thereby indicating that the printed total is merely a running or "sub-total".

Referring to Fig. 13, there will be seen a sample of an imprint made by the illustrative machine. The printed amount on the upper line in this figure represents the amount of the sales transacted since the last resetting operation was performed and up to the time the impression was taken. Adjacent to the printed amount are the characters "ST" indicating that the total is merely a "sub-total". The "Reset" number "002" which is identified by the characters "RES" indicates that two clearing operations were previously performed. The numbers "0050" adjacent the abbreviation "CUST" indicate the number of times the machine has been operated, since the last resetting operation, three of the fifty operations of the machine having been "No sale" operations, as shown by the printed numbers "003" to the right of the abbreviation "NS". The date appears to the extreme right of the lower printing line.

Of course, if the person in possession of the key of the lock 151 desires to obtain the printed information later he is free to do so, but each printed record will continue to bear the character "ST" as well as the same "Reset" number indicating that a clearing operation has not been performed.

When a grand total is wanted, it is desirable to indicate the fact that one is to be taken upon the record material, so that the printed amounts will represent those which were taken just prior to the resetting operation.

The resetting lever in the present instance, is normally locked but after the control lever is shifted to the "Total" position it may be unlocked for operation by a special knob 205 (Figs. 1, 7, 8, 9 and 12) when the latter is adjusted to the proper position. Operation of the special knob not only unlocks the resetting lever for operation, but performs a number of other functions which will be explained as the specification progresses.

The special device which as herein disclosed may take the form of a rotatable knob projecting through the cabinet 30 (as shown in Fig. 12) is provided with a flange bearing the characters "ST" and "GT" and is normally in the "ST" position. As best shown in Fig. 9, the barrel of the knob 205 projects into a member 206 which is connected to a plate 207 (Fig. 8) attached by any suitable means such as screws to the side plate 26. Secured to the lower portion of the knob is a cam plate 208 formed with a short slot 209 and a longer cam slot 210, both of which cooperate with a stud 211 carried by the bell-crank 159. As will be apparent in Fig. 9, when the shaft 156 is in its normal position, that is, when it is not shifted by the rotation of the key in the lock 151, it will be impossible to rotate the knob 205 due to the co-operation of its slot 209 with the stud 211 and it will, therefore, be understood that even though the cover 32 may be fraudulently raised it will be impossible to rotate the knob 205.

The shaft 156 is provided with a slot 212 (Figs. 6 and 9) which is similar to the slot 169 associated with the control lever 138. When the shaft 156 is shifted to the right by the rotation of the key in the lock 151, as previously explained it will bring the slot 169 in the plane of the semi-circular notches 170 formed in the control lever, thereby unlocking it for operation, but the slot 212 will be shifted further away from the circular notch 213 (Fig. 5) formed in the resetting lever 97 retaining it in its locked position. The knob 205 is however unlocked for operation due to the disengagement of the stud 211 from the short slot 209 and as it is rotated, it will shift the shaft 156 reversely to the left a sufficient amount to bring the slot 212 in the path of the semi-circular notch 213 formed in the resetting lever 97 to free the latter.

It will be apparent from a consideration of Figs. 7 and 9 that the control lever must be in one of the positions other than the "Total" position before the knob 205 can be rotated to shift the shaft 156 to the left. This is due to the fact that no semi-circular notch 170 (Fig. 7) is provided for the "Total"

position of the control lever so that it is impossible to shift the shaft 156 while the lever is in this position. It will also be understood that one of the locking devices for the resetting lever is disabled by the adjustment of the knob 205 and to completely unlock it the control lever must be subsequently shifted to the "Total" position.

When the shaft 156 is shifted to the left by rotation of the knob 205 as will be mentioned, the pin 155 will pass in a slot 2131 (Fig. 9) formed in the cam plate 153, which, it will be remembered has been rotated clockwise by the previous rotation of the key of the lock 151. Furthermore, when the shaft 156 is shifted to the left it will bring a slot 214 (see also Fig. 6) (similar to the slots 169 and 212) into the plane of the control lever 138, and it will be noted therefore, that the control lever is also unlocked for movement when the knob 205 is rotated to the "GT" position. This permits adjustment of the control lever to the "Total" position to finally unlock the resetting lever 97.

Operation of the knob 205 will rock the bell-crank 159 counter-clockwise forcing the plate 161 rearwardly from the position shown in Fig. 8. It will be noted from Fig. 11 that the special character printing member 129 is loosely pivoted upon an extension of the totalizer supporting shaft 58, and that it is provided with a laterally extending pin 215 co-operating with a cam slot 216 formed in a forward extension of the plate 161. It will be obvious that when the plate 161 is moved rearwardly the cam slot 216 co-operating with the pin 215 will rock the special character printing member clockwise, thereby bringing the upper characters "ST" out of the range of the printing platen 105 and bringing the lower characters "GT" to such a position that when the printing mechanism is subsequently operated, the characters G "ST" will be printed adjacent the total. The special character printing member is aligned in either position by means of the spring-pressed aligning pawl 217.

While adjustment of the knob 205 and subsequent movement of the control lever to the "Total" position unlocks the resetting lever, the resetting operation will, of course, not be performed until the printed information is first obtained. In practical operations in order to obtain a grand total it is first necessary to insert the key in the lock 151 and shift the shaft 156 to unlock the rotatable knob 205 and by the adjustment of the latter adjust the special type carrier 129 and then to operate the printing mechanism, the control lever, of course, being brought to the "total" position, after turning of the knob, to unlock the printing mechanism. As has previously been stated, movement of the control lever to the "Total" position will withdraw the locking edge 172 (Fig. 7) from locking co-operation with the lug 171 and bring it into co-operative relationship with the notch 187 of the locking member 173. In the same manner, as shown in Fig. 8, the locking lug 122 will also be brought into co-operative relationship with the notch 188 of the member 175. Therefore, since the printing mechanism is now unlocked the operator may depress the button 125 to rock the printing mechanism to print upon the record material the data shown in Fig. 14. The printed amount in the first line in this case, represents the sales for a period longer than that represented by the record in Fig. 13, and for this reason the printed record shown in Fig. 14 shows a greater number of operations of the machine and "No sale" operations. The "Reset" number 002 has not been changed since no clearing operations have been performed in the meantime, but adjacent the printed total is the character "GT" indicating that the rotatable knob 205 has been adjusted to prepare the mechanism for a resetting operation.

As previously explained when the control lever is brought to the "Total" position the extension 185 (Fig. 7) co-operates with the stud 186 to rock the locking arm 173 clockwise and thus forces the pin 181 upwardly out of the slot 180, thereby unlocking the resetting lever for operation, and since the two locks are now disabled the resetting lever may be manipulated to reset the registering elements.

When the resetting lever 97 is moved rearwardly the arm 95 (Fig. 7) to which the link 96 is connected, will elevate the pin 94 and cock the operating means associated with the resetting counter so that when the machine is subsequently operated it will add a unit to the counter indicating the "Reset" number pertaining to the next series of sales to be registered.

After a resetting operation has been performed it is usually desirable to again operate the printing mechanism to ascertain whether or not the resetting operation has been correctly performed as exemplified in Fig. 15, and after this has been done the operator will then bring the control lever out of the "Total" position so as to permit the knob 205 to be brought back to the "ST" position. When the control lever is in one of the three rearmost positions the cover 32 is then closed and the key in the lock 151 rotated so as to operate the cover catch to prevent unauthorized access to any of the manipulative devices which it conceals.

In order to prevent a number of mis-operations which might be possible, certain additional precautionary devices are included so as to insure, as nearly as possible, correct operations of the machine.

It is desirable while printing is being performed that the resetting lever be locked against operation. It will be evident that when the printer is moved rearwardly from the position shown in Fig. 7, with the control lever in the "Total" position, the engagement of the lug 171 with the slot 187 will hold the locking member 173 rigidly and if it is attempted to move the resetting lever it will be locked against movement since a bevel edge 220 (Fig. 5) on the member 178 will co-operate with the stud 181 carried by the rigidly locked member 173. It will, therefore, be impossible to move the resetting lever to accomplish the reseting operation so long as the printer is in the printing position.

While the resetting operation is being performed, it is desirable to lock the printing mechanism and the control lever against movement from the position shown in Fig. 7. When the control lever is in the "Total" position and the resetting lever operated, the bevel edge 220 on the member 178 will cam the pin 181 upwardly, thereby rocking the locking member 173 clockwise to bring a locking edge 221 (formed just above the slot 187 in the member 173) in front of the stud 171. In a similar manner, referring to Fig. 8, the locking arm 175 will be rocked counter-clockwise to carry the locking edge 222 in front of the locking lug 122. This will positively lock the printer against operation as long as the resetting lever is displaced from its normal position.

At the same time when the locking member 173 is rocked clockwise, as viewed in Fig. 7, by movement of the resetting lever it serves to bring the pin 181 in back of a shoulder 223 formed on the member 182 which is attached to the control lever 138. This locks the control lever 138 in its "Total" position thereby preventing it from being moved to unlock the operating keys.

The present invention also includes means whereby when the knob 205 is adjusted to the "GT" position the operating keys will be locked until the resetting lever is operated. For this purpose the shaft 156 (Fig. 9) is provided with another slot 225 which, as shown in Fig. 6, is at a different angle from the slots 169, 212 and 214. The slot 225 is adapted at times to be brought into the plane of the upper end 226 (Fig. 5) of a locking lever 227, the lower end of which is provided with a shoulder 228, similar to the shoulders 143 of the locking members 145 and 142, previously referred to. The shoulder 228 is also adapted at times to pass over the flange or nose of the key coupler 36, thereby locking the key coupler and the keys against operation. As will be observed, in Fig. 9, rotation of the key in the lock 151 will shift the shaft 156 to the right and will bring the notch 225 out of the plane of the locking member 227. However, when the knob 205 is adjusted to the "GT" position, the slot 225 will register with the upper end 226 of the locking element 227 (Fig. 5) and permit a connected spring 229 to draw the shoulder 228 over the flange of the key coupler to lock the keys. From the immediately preceding description, it will be obvious that once the knob 205 is adjusted to the "GT" position the keys cannot be operated even though the control lever is set for an item registering operation. Connections are provided which make it necessary to operate the resetting lever once to subsequently free the operating keys and for this purpose the resetting lever is provided with a stud 230 (Fig. 5) co-operating with a foot 231 integral with the member 227. Rearward movement of the resetting lever 97 to perform a resetting operation will cause the stud 230 to strike the foot 231 thus rotating the locking member 227 clockwise, and thereby withdrawing the shoulder 228 from the flange of the key coupler and unlocking the keys. Clockwise movement of the locking member 227 will also bring the upper end 226 out of co-operative relationship with the slot 225 and, furthermore, permit a hook 232 of a latching member 233 to engage a lug 234 of the locking member 227. This will retain the locking member in such a position that its upper end will not re-enter the slot 225 and will, therefore, not interfere with the return shifting of the shaft 156 by the turning of the knob 205. Subsequently when the control lever is adjusted out of the "Total" position and one of the keys is operated the flange of the key coupler 36 will strike an extension 235 of the latching member 233 thereby disengaging the hook 232 from the lug 234 and permitting the upper extension 226 to strike an element, which in the meantime, has passed in front of the extension as will now be explained in detail.

It may be desirable at times to permit the successive registrations of a series of items after a resetting operation has been performed without returning the special type printing member from the "GT" to the "ST" position and without requiring alternate operations of the resetting lever to disable the key locking device 227. Just how this may be performed will be understood from an inspection of Figs. 5 and 9. In both of these figures all the manipulative devices are locked against operation, but as previously explained, when the barrel of the unlocked knob 205 is rotated it will bring the notch 225 to register with the locking element 227 and when the upper end 226 of the locking element 227 passes off the periphery of the shaft 156 the spring 229 will force the locking shoulder 228 over the key coupler and thereby lock the keys against operation until the resetting lever is operated. The printed total is first obtained and it will be identified by the special character "GT" on the record bearing material and then a subsequent operation of the resetting lever will disable the key locking lever 227 bringing it back slightly forward of the normal position shown in Fig. 5 so that the shoulder 234 will be caught by the hook 232. If it were now, for some reason, desired to add an item or a series of items to the zeroized totalizer so that the total amount could be subsequently printed together with the character "GT," it would be first necessary to adjust the mechanism for an item entering operation, that is, adjust the control lever 138 out of the "Total" position. The proper keys could then be operated and the upward movement of the key coupler would strike the latching member 235 thus disengaging the shoulder 234 from the hook 232 and permitting the upper extension 226 of the locking member 227 to again register with the notch 225 of the shaft 156, which, at this time would not have been moved since the knob would not have been adjusted out of the "GT" position. This again would bring the locking shoulder 228 over the key coupler to lock the keys against another operation and if no mechanism were provided it would be necessary to unlock the resetting lever 97 by again bringing the control lever 138 to the "Total" position and then to operate the resetting lever so that the stud 230 co-operating with the extension 231 would disable the key locking lever 227. Therefore, it will be observed that, without the use of special devices, it would not be possible to accumulate a series of items in the totalizer while the knob 205 is in the "GT" position.

As will be noted from Fig. 9, there is provided a plate 236 pivoted at 237 to the guide plate 140 (Fig. 5) and normally urged in a clockwise direction by a spring 238 so that one side of the plate 236 normally contacts with an adjacent side of the locking member 227. Due to this contact when the shaft 156 is shifted to the left by the knob being brought to the "GT" position, it will be retained in substantially the position shown in Fig. 9, even though the upper extension 226 of the locking member 227 registers with the notch 225, so as to lock the keys against operation when the knob is adjusted. After the grand total has been obtained and printed upon the record bearing material, it is, of course, necessary to operate the resetting lever to again unlock the keys for operation. However, when the resetting lever is operated the contact of the pin 230 with the foot 231 (Fig. 5) will rock the locking lever 227 clockwise sufficiently to disengage the extension 226 from the extreme forward edge of the plate 236. The spring 238 (Fig. 9) will act upon the plate 236 rocking it clockwise as viewed in Fig. 9, so that its forward edge will co-operate with the extension 226 which has in the meantime been moved forwardly, thus retaining the lower end of the locking member 227 in an unlocking position. By adjustment of the control lever away from the "Total" position it will then be possible to enter an item in the machine by the operation of the keys or, if so desired, a series of them, the amounts being entered upon the totalizer which has previously been set to zero. After the necessary number of items have been accumulated, the total is then obtained and the totalizer reset. Then the knob 205 may be adjusted to bring the total printing member to the "ST" position and by means of a pin 239 carried by the shaft 156 it will rock the plate 236 counter-clockwise restoring it to the position shown in Fig. 9. The final operation consists in rotating the key of the lock 151 to lock all the manipulative devices and cover 32.

*General summary of operation*

The nature of the improved mechanism is such that in order to make the foregoing description as clear as possible it has been necessary to state the operation considerably in detail as an incident to explaining the various features of construction. A complete re-statement here of the operation is therefore believed to be unnecessary. However, a résumé of the general operation of the machine will now be given to co-ordinate the operation and functions of the various parts which have been described in detail.

To enter the first cash transaction which it will be assumed amounts to $1.65 the appropriate keys in the dollars, dimes and pennies banks are depressed so that the notches 38 (Fig. 1) in the rear ends of these keys engage the flange 37 of the key coupler 36 and through the rotation shaft 43 and the link 59 (Fig. 5) the totalizer elements 57 (Fig. 1) are drawn into engagement with the differentially operated racks 54. As the proper keys are depressed the attached rollers 47 will work in the associated cam slots 52 formed in the plates 48 of the differential frames related to the three banks. The frames 50 will each be differentially operated so as to move the racks 54 an amount commensurate with the depressed keys. Since the totalizer pinions 58' are drawn into mesh with the actuating racks 54 before the racks have moved, the operated racks will move the pinions 58' differentially so that the amount $1.65 will be added on the totalizer elements 57. On the return of the keys to normal position the totalizer pinions will be disengaged from the racks so that the return movement of the latter will not affect the amount registered.

During the rotation of the shaft 43 the eccentrically mounted disk 83 (Fig. 2) will operate the bell-cranks 82 and 80 so as to rock the bail 78 to add a unit in the units wheel 74 (Fig. 4) of the "Customer" counter. During the first transaction following a resetting operation the pin 79 associated with the "Customer" counter will co-operate with the extension 93 of the bail 91 associated with the "Reset" counter, which was cocked forward on the previous resetting operation, and will thus force the bail 91 rearwardly so as to add a unit in the "Reset" counter. The number then standing on the "Reset" counter would be the special reset number for the sales to be accumulated during the period just begun.

As the shaft 43 rotates, the cam 136 (Fig. 7) cooperating with the stud 135 raises the drawer release link 134 and through the arm which is connected to the shaft 133 rocks said shaft, thereby raising the drawer catch 132 and disengaging it from the cash drawer thus permitting the spring 133 to eject the latter.

Whenever it is necessary to release the cash drawer for the purpose of making change, etc., the "No sale" key 33 may be operated and during its depression the link 90 (Fig. 7) will be drawn downwardly and by means of the arm 89 attached to the shaft 81 will rock said shaft as well as the arm 88 (Fig. 4) and by means of the co-operation of the latter with the bail 86 will add a unit in the "No sale" counter wheels 84.

At the termination of a day's business it is desirable to obtain the available information in printed form and to this end the proprietor inserts his key in the lock 151 (Figs. 3 and 9) and rotates the cam 153 counter-clockwise thereby unlatching the cover 32 so that it may be elevated to render access to the unlocked control lever 138. The control lever is then brought to the "Total" position so as to unlock the printing button 125 (Fig. 7). If the printing impression which is to be obtained is not to be followed by a clearing operation the special knob 205 will be left in the "ST" position and the printer button will be sharply depressed so as to force the rubber impression blocks rearwardly, thereby forcing the paper against the inking ribbon and adjusted type members. After the printing operation has been performed a printed portion of the strip, an example of which is shown in Fig. 13, is withdrawn and detached from the rest of the roll.

Since the special type carrying member 129 (shown in Fig. 11) has not been moved from its normal position it will print the characters "ST" adjacent the total thus indicating that the printing of the total is not to be followed by a clearing operation.

When it is desired to print a total which is to indicate the grand total of all the items entered in the machine during a particular period after which the totalizer elements are to be brought to their normal positions in preparation for the accumulation of a series of items comprising a subsequent period of business, the special knob 205 (Fig. 12) is adjusted to the "GT" position. Before this is possible it is necessary to bring the control lever out of the "Total" position and then the rotation of the knob 205 will bring the notch 212 in the plane of the resetting lever 97. Furthermore, the notch 225 will be brought to co-operate with the upper extension of the locking lever 227 so that its shoulder 228 will pass over the flange 37 of the key coupler 36, thereby locking the keys against operation.

Since the resetting lever is now fully unlocked for operation it may be forced rearwardly to perform a resetting operation, but the operator, will, of course, first obtain the printed total. Adjustment of the knob 205 to the "GT" position will have rocked the bell-crank 159 counter-clockwise, as viewed in Fig. 9, forcing the plate 161 (Fig. 8) rearwardly, so that the cam slot 216 (Fig. 11) co-operating with the pin 215 will have rocked the special character printing member clockwise thereby bringing the upper characters "ST" out of the range of the printing platen 105 and bringing the lower characters "GT" to such position so that when the printing mechanism is subsequently operated the character "GT" will be printed adjacent the total.

After a printed total is obtained the resetting lever is forced rearwardly and as it is moved the segment teeth formed on the extension 194 of the resetting lever 97 will rotate the gear 195 (see Fig. 5) and the bent disk 198¹ (Fig. 4) to shift the shaft 58 laterally until the notches in the shaft co-operate with the resetting pawls carried by the totalizer elements 57. At the same time the gear 200 carried by the shaft 58 will be brought into mesh with the gear 197 which is rotated with the gear 195, said gear 197 also rotating the gear 198 to take up the play normally existing between one end of the annular ring 201 (Fig. 10) carried by the gear 198 and the lug 202 integral with the collar 203 fast to the special counter resetting shaft 72. Further rearward movement of the resetting lever 97 will rotate both of the resetting shafts 58 and 72 so as to reset all the totalizer elements and all the special counter accumulating elements, with of course, the exception of the "Reset" counter wheels.

When the reset lever was forced rearwardly the connected link 96 (Fig. 7) operated the arm 95 and forced the pin 94 (Fig. 4) and the bail 91, to which it is attached, clockwise (Fig. 5) so that the operating pawl associated with the "Reset" counter will slip idly over the ratchet wheels to its forward cocked position. This also brought the lug 93 into contact with the pin 79 carried by the "Customer" counter operating bail so that this bail will also operate the "Reset" counter and accumulate a unit therein during a subsequent operation of the machine.

Furthermore, when the resetting lever is drawn rearwardly the stud 230 (Fig. 5) cooperates with the foot 231 to rotate the locking member 227 clockwise thereby withdrawing the shoulder 228 from the flange of the key coupler 36 to unlock the keys. Clockwise movement of the locking member 227 will bring the upper end 226 out of co-operating relationship with the slot 225 and, furthermore, permit a hook 234 of the latching member 233 to engage a lug 234 of the locking member 227.

After the resetting operation has been performed the printer button is usually again depressed in order to indicate on the record strip whether the resetting operation has been correctly performed, as exemplified in Fig. 15. If this is the case the operator will then bring the control lever out of the "Total" position to any desired one of its other positions and if it is not desired to add additional items in the totalizer with the knob 205 left in the "GT" position, the next operation will consist in bringing the knob 205 to the "ST" or its normal position. The key of the lock 151 may then be rotated to lock the different manipulative devices as well as the cover 32, which will have been brought to its concealing position.

While the form of embodiment of the invention herein shown and described is admirably adapted to fulfill the objects primarily stated, it is to be understood that it is not intended to confine the invention to the one form of embodiment herein shown since it may be embodied in various forms all coming within the scope of the claims which follow:

What is claimed is:

1. In a cash register, the combination of a plurality of registering keys, a main operating mechanism, a totalizer adapted to accumulate items under the control of the keys, means for printing the totals of said items, means for clearing said totalizer independently of an operation of the main operating mechanism, and means for setting a distinguishing character type prior to and as an incident to the operation of the clearing devices, said distinguishing character being printed in alignment with the total when total printing is effected.

2. In an accounting machine, the combination of printing and totaling devices, a main operating mechanism, a totalizer, separate devices for clearing said totalizer, of a special manipulative device actuated as an incident to the operation of the devices for clearing said totalizer, said manipulative device controlling the printing of a special designating character and remaining in actuated position until after operation of said devices for clearing the totalizer, and means for taking impressions directly from said totalizer.

3. In an accounting machine, the combination of total printing devices located within a cabinet, means for clearing said devices, a manipulative member for controlling a printing impression from the total printing devices, an adjustable special character printing member, a knob adjustable to control the adjustment of the special character printing member to print different characters adjacent the totals and simultaneously controlling the operation of said clearing means, and indicia carried by the knob to indicate the position of the special character printing member.

4. In a cash register, the combination of a totalizer, means for clearing the totalizer, locking devices for the clearing means, a main operating mechanism, three or more separately operable manipulative devices for disabling the locking devices and means requiring the operation of the manipulative devices in a predetermined order to completely unlock the clearing devices.

5. In a cash register, the combination of a totalizer, normally locked means for clearing the totalizer, a manipulative device operated prior to and as an incident to a clearing operation for unlocking the clearing means, a special type carrier for designating whether or not the clearing means has been unlocked, connections from the manipulative device to the special type carrier whereby it may be directly moved to either of its designating positions until subsequent adjustment of said devices, and a printing mechanism for printing from the special type carrier upon a record material.

6. In a cash register, the combination of a totalizer, normally locked clearing devices therefor, a printing mechanism, a knob operated prior to and as an incident to the operation of said clearing devices for unlocking the latter, and a special type character having connections to the knob whereby the latter may move the former into and out of printing position.

7. In a cash register, the combination of a totalizer, a special type carrier, a normally locked lever for clearing said totalizer, a rotatable knob, and means controlled by the knob for unlocking said lever and adjusting said special type carrier to printing position.

8. In a cash register, the combination of a totalizer, a normally locked lever for clearing said totalizer, an operating mechanism, a rotatable knob, and means controlled by the knob for simultaneously unlocking the lever and locking the operating mechanism.

9. In a cash register, the combination of a totalizer, normally locked clearing devices for said totalizer, a special type carrier for designating when a clearing operation is to be performed, a counter for designating the number of clearing operations, a knob for adjusting the special type character and simultaneously unlocking the clearing devices, and means controlled by the clearing devices for actuating the special counter.

10. In a cash register, the combination of a totalizer, clearing devices therefor, a special type carrier for designating when a clearing operation is to be performed, means for adjusting said type carrier as a necessary incident to operation of said clearing devices, a special counter, and means controlled by the clearing devices for actuating the special counter.

11. In a cash register, the combination of operating mechanism, a totalizer, clearing devices therefor, a special type carrier for designating when a clearing operation is to be performed, means for adjusting said type carrier as a necessary incident to operation of said clearing devices, a special counter, means controlled by the clearing devices for operating the special counter, and means controlled by the operating mechanism for operating the special counter.

12. In a cash register, the combination of a totalizer, normally locked devices for clearing the totalizer, a manipulative device operated as an incident to the operation of the clearing devices, a counter controlled by the clearing devices for indicating the number of times the clearing devices have been operated, a special type carrier, and means controlled by the manipulative device for adjusting the type carrier and unlocking the clearing devices.

13. In a cash register, the combination of a totalizer, normally locked devices for clearing the totalizer, a manipulative device operated as an incident to the operation of the clearing devices, a counter controlled by the clearing devices for indicating the number of times the clearing devices have been operated, a special type carrier, means controlled by the manipulative devices for adjusting the type carrier and unlocking the clearing devices, and a printing mechanism for printing from the special type carrier and counter upon a record material.

14. In a cash register, the combination of a totalizer, a normally locked clearing device therefor, and a plurality of manually operable devices effective in the same plane and operable in a predetermined sequence in order to unlock the clearing device.

15. In a cash register, the combination of a totalizer, a normally locked clearing device therefor, a plurality of manipulative devices operable in a certain sequence upon a single locking element to unlock the clearing device, and a special indicator for a clearing operation controlled by one of the manipulative devices.

16. In a cash register, the combination of a totalizer, a clearing device therefor, a member for normally locking the clearing device, and means comprising a plurality of manipulative devices for giving the member different movements to unlock the clearing device.

17. In a cash register, the combination of a totalizer, a clearing device therefor, a member for normally locking said device, a manipulative device for moving said member to a position in which the clearing device still remains locked, and an additional manipulative device for giving the member a different movement to unlock the clearing device.

18. In a cash register, a totalizer, a clearing device therefor, a member for normally locking said device, a manipulative device for moving said member to a position in which the clearing device still remains locked, and a second manipulative device unlocked by said first manipulative device and adapted when operated to move said member to unlock the clearing device.

19. In a cash register, the combination of a lever, a member for normally locking said lever, a manipulative device for moving the member in one direction, said lever remaining locked during and after said movement, and means for subsequently moving the member in a reverse direction to unlock the lever.

20. In a cash register, the combination of a lever, a member for normally locking said lever and means compelling successive reverse movements of said member to different extents in order to unlock said lever.

21. In a cash register, the combination of a totalizer, a clearing device therefor, a plurality of operating keys, a manipulative device and connections for locking the keys as an incident to the operation of the clearing device, means controlled by the clearing device for disabling the key locking connections, and means for preventing relocking of the keys until restoration of the manipulative device after the clearing device has once been operated.

22. In a cash register, the combination of a totalizer, a normally locked clearing device therefor, a plurality of keys, a manipulative device for unlocking the clearing device, interlocking connections adapted to require alternate operations of the clearing device and the operating keys when the clearing device has been unlocked, and means whereby the interlocking connections will be retained in an ineffective position when the clearing device is operated once.

23. In a cash register, the combination of a totalizer, a clearing device therefor, operating keys, a special indicating device for indicating when a clearing operation is to be performed, interlocking devices requiring alternate operations of the clearing device and the operating keys when the special indicator indicates a clearing operation, and means for disabling the interlocking devices even though the special indicator remains in position indicating a clearing operation.

24. In a cash register, the combination of a totalizer, a clearing device therefor, operating keys, interlocking devices serving to require alternate operations of the operating keys and clearing devices, and means disabling said interlocking devices to provide for successive operations of the keys when the clearing device has been operated once.

25. In a cash register, the combination of a totalizer, a clearing device therefor, operating keys, interlocking devices requiring alternate operation of the operating keys and clearing device, means disabling said interlocking devices to provide for successive operations of the keys when the clearing device has been operated, and indicating means adjustable to maintain said interlock ineffective.

26. In a cash register, the combination of a totalizer, a clearing device therefor, operating keys, interlocking devices requiring alternate operation of the operating keys and clearing device, means disabling said interlocking devices to provide for successive operations of the keys when the clearing device has been operated, and indicating means adjustable to maintain said interlock ineffective, said indicating means being adapted to shift said disabling means into inactive position.

27. In a machine of the class described, a totalizer, a clearing device therefor, a plurality of operating keys, a manipulative device and connections for locking the keys as an incident to the operation of the clearing device, means controlled by the clearing device for disabling the key locking connections while the manipulative device remains in key locking position, means disabled upon a subsequent operation of the keys for holding said connections disabled and separate means for holding said connections disabled upon succeeding operations of the keys.

28. In a machine of the class described a special type carrier, a totalizer, manually operable clearing means therefor, a plurality of separate manipulative devices controlling the operation of said clearing means, a lock controlled member for controlling the operation of said manipulative devices and means compelling the operation of said manipulative devices in sequence to control said clearing means, one of said manipulative devices actuating said special type carrier to printing position.

29. In a machine of the class described a totalizer, means for entering items therein, means for printing totals from said totalizer, clearing means for said totalizer, indicia bearing means for determining whether a grand total or a stub total is to be printed, means controlled by said indicia bearing means for locking said item entering means when a grand total is to be printed but held inactive when a sub total is to be printed, and connections from said clearing means for releasing said item entering means from said locking means.

30. In a machine of the class described, a totalizer, separate manual means for printing totals and for clearing said totalizer, a control element for controlling the operation of said separate means, an extra manipulative device for controlling the operation of said clearing means, a lock controlled member for controlling the operation of said control element and said manipulative device, and means compelling a certain sequence of operation when both said control element and said manipulative device are to be operated.

31. In a machine of the class described a totalizer, means for entering items therein, means for printing totals therefrom, means for clearing said totalizer, an adjustable character bearing member for printing special symbols adjacent totals, means for adjusting said member and simultaneously controlling said clearing means and said item entering means, and connections from said clearing means for disabling said control while said means and member remain in adjusted position.

32. In a cash register, the combination of a totalizer, a main operating mechanism for actuating said totalizer, normally locked means for clearing said totalizer, a manipulative device operable independently of said main operating mechanism for unlocking said clearing means, a special type carrier for designating whether or not the clearing means has been unlocked, connections from the manipulative device to the special type carrier whereby the latter may be directly moved to either of its designating positions, and a printing means for printing from the special type carrier upon a record material.

33. In a cash register, the combination of a totalizer, a main operating mechanism for actuating said totalizer, normally locked means for clearing said totalizer, a manipulative device operable independently of said main operating mechanism for unlocking the clearing means, a special type character, and means whereby movement of said manipulative device for unlocking said clearing means conditions said type character for printing.

34. In a device of the class described, a totalizer, a special type carrier adjacent said totalizer, normally locked means for resetting said totalizer, and a manipulative device for releasing said resetting means for operation and adjusting said special type carrier to printing position.

35. In a machine of the class described the combination of a totalizer, normally locked means for resetting said totalizer, a normally locked knob carrying indicia thereon, key operated means for releasing said knob, a normally locked control lever, means operated by said knob for releasing said control lever, and means operated by movement of said control lever to a certain position for releasing said resetting means for operation.

In witness whereof, I have signed my name hereto this 22nd day of October, 1925.

CHARLES W. GREEN.